United States Patent
Kamsma

(10) Patent No.: US 7,241,216 B2
(45) Date of Patent: Jul. 10, 2007

(54) AIR GUIDE HOUSING

(75) Inventor: Huub R. Kamsma, Filderstadt (DE)

(73) Assignee: Modine Manufacturing Company, Racine, WA (US)

( * ) Notice: Subject to any disclaimer, the term of this patent is extended or adjusted under 35 U.S.C. 154(b) by 101 days.

(21) Appl. No.: 11/057,319

(22) Filed: Feb. 11, 2005

(65) Prior Publication Data
US 2005/0181721 A1 Aug. 18, 2005

(30) Foreign Application Priority Data
Feb. 12, 2004 (DE) ........................ 10 2004 006 832

(51) Int. Cl.
*B60S 1/54* (2006.01)
(52) U.S. Cl. ........................................ 454/126; 454/143
(58) Field of Classification Search ................ 454/121, 454/126, 143; 165/41, 42
See application file for complete search history.

(56) References Cited
U.S. PATENT DOCUMENTS 5,062,352 A * 11/1991 Ostrand ........................ 454/121
5,350,335 A * 9/1994 Andersson .................... 454/121
5,366,408 A * 11/1994 Andersson .................... 454/121
5,399,120 A * 3/1995 Burns et al. .................. 454/126
6,113,483 A * 9/2000 Schambre et al. ............ 454/121
6,261,172 B1 * 7/2001 Shibata ........................ 454/121
6,652,372 B2 11/2003 Müller

FOREIGN PATENT DOCUMENTS

DE 97 33 052 A1 2/1999
DE 199 15 966 A1 10/1999

* cited by examiner

*Primary Examiner*—Derek S. Boles
(74) *Attorney, Agent, or Firm*—Michael Best & Friedrich LLP

(57) ABSTRACT

An air guide housing for an air supply for an input fan of an air conditioner, including a housing wall with a side wall having a first opening therethrough for circulating air, a second opening therethrough for fresh air, and a third opening in the side wall for air drawn in by the fan, where the first opening is adjacent the second opening. The housing also includes an adjustment element pivotally mounted in the housing wall, where the adjustment element includes a peripheral section defining a closure element of the air guide housing adapted to block selected portions of the first and second openings. The peripheral section has a cross-section smaller than the sum of the cross-sections of the first and second openings.

8 Claims, 4 Drawing Sheets

AIR GUIDE HOUSING

CROSS REFERENCE TO RELATED APPLICATION(S)

Not applicable.

STATEMENT REGARDING FEDERALLY SPONSORED RESEARCH OR DEVELOPMENT

Not applicable.

REFERENCE TO A MICROFICHE APPENDIX

Not applicable.

TECHNICAL FIELD

The present invention relates to air guide housings, and more particularly to adjustable housings for guiding an air conditioned air supply produced by a fan.

BACKGROUND OF THE INVENTION AND TECHNICAL PROBLEMS POSED BY THE PRIOR ART

Air guide housings are provided, for example, to guide fresh and recirculated air to the passenger compartment of a vehicle. DE 197 33 052 A1 discloses one such air guide, which has a relatively costly and demanding mounting and guiding of the rotatable air vent body. The bell-like air vent body sits on the lower edge of the fan housing. The intake housing, which has the same bell shape but has two openings (one for fresh air and one for circulating air) is situated around the air vent body. The air leaves the intake housing downward, almost through the bottom of the bell, in order to be drawn in by the fan. When both housing openings are closed, no air is fed to the fan and the air is not circulated in the passenger compartment. In some conditions (e.g., in winter), fogging of the windshield and resulting dangerously poor driver visibility can occur. Also, a comfortable, persistent temperature in the passenger compartment cannot be guaranteed due to no air is passed through the heater or air conditioner. Overall, this is a relatively costly design which can be unreliable in everyday operation.

Another air guide housing, with a pivoting vent or semi-cylindrical drum vent, is described in DE 199 15 966 A1. This structure may be used to supply fresh air and/or circulating air to a fan by means of ribs integrated in the housing, which ribs are supposed to divert the air stream at the entry to the fan and prevent mixing of circulating air and fresh air in front of the fan. However, during slow rotation of the pivot vent or drum vent between the selected positions of fresh air to circulating air, fresh air may flow around the rib directly into the passenger compartment through the circulation inlet. This can be in different conditions be undesirable, particularly in winter.

The present invention is directed toward overcoming one or more of the problems set forth above.

SUMMARY OF THE INVENTION

In one aspect of the present invention, an air guide housing for an air supply for an input fan of an air conditioner is provided. The housing includes a housing wall including a side wall having a first opening therethrough for circulating air, a second opening therethrough for fresh air, and a third opening in the side wall for air drawn in by the fan, where the first opening is adjacent the second opening. The housing also includes an adjustment element pivotally mounted in the housing wall, where the adjustment element includes a peripheral section defining a closure element of the air guide housing adapted to block selected portions of the first and second openings. The peripheral section has a cross-section smaller than the sum of the cross-sections of the first and second openings.

In one form of this aspect of the present invention, the housing wall is substantially barrel-like with a generally circular bottom and a generally circular cover, and the adjustment element includes generally circular plates pivotally secured to the bottom and the cover with the peripheral section secured between the arms.

In another form of this aspect of the present invention, the peripheral section extends over a selected arc around at least ⅓ of the housing, and the first and second openings extend over an arc greater than the selected arc, where the selected arc and the arc of the first and second openings extend about the axis about which the adjustable element is pivotally mounted. In a further form, the housing wall is substantially barrel-like with a generally circular bottom and a generally circular cover, and the adjustment element includes generally circular plates pivotally secured to the bottom and the cover with the peripheral section secured between the arms.

In still another form of this aspect of the present invention, stops are fixed relative to the housing wall for limiting pivoting of the adjustment element.

In yet another form of this aspect of the present invention, concentric grooves are provided between the adjustment element plates and the housing wall bottom and cover. In a further form, the concentric grooves define seals between the adjustment element plates and the housing wall bottom and cover.

In a further form of this aspect of the present invention, the housing wall comprises two housing parts releasably connected to each other with the adjustment element pivotally secured therebetween.

In yet another aspect of the present invention, an air supplier is provided, including first and second air guide housings, and a fan drive unit between the first and second air guide housings. Each of the housings includes a housing wall including a side wall having a first opening therethrough for circulating air, a second opening therethrough for fresh air, and a third opening in the side wall for air drawn in by the fan, where the first opening is adjacent the second opening. The housings also each include an adjustment element pivotally mounted in the housing wall, where the adjustment element includes a peripheral section defining a closure element of the air guide housing adapted to block selected portions of the first and second openings. The peripheral section of each housing has a cross-section smaller than the sum of the cross-sections of the first and second openings. The fan drive unit is adapted to receive air from the third opening of both of the housings. A position control for the adjustment elements of both of the housings includes a common drive for controlling the position of both of the adjustment elements.

In one form of this aspect of the present invention, the common drive is a servo motor.

DETAILED DESCRIPTION OF THE INVENTION

Figure 1:
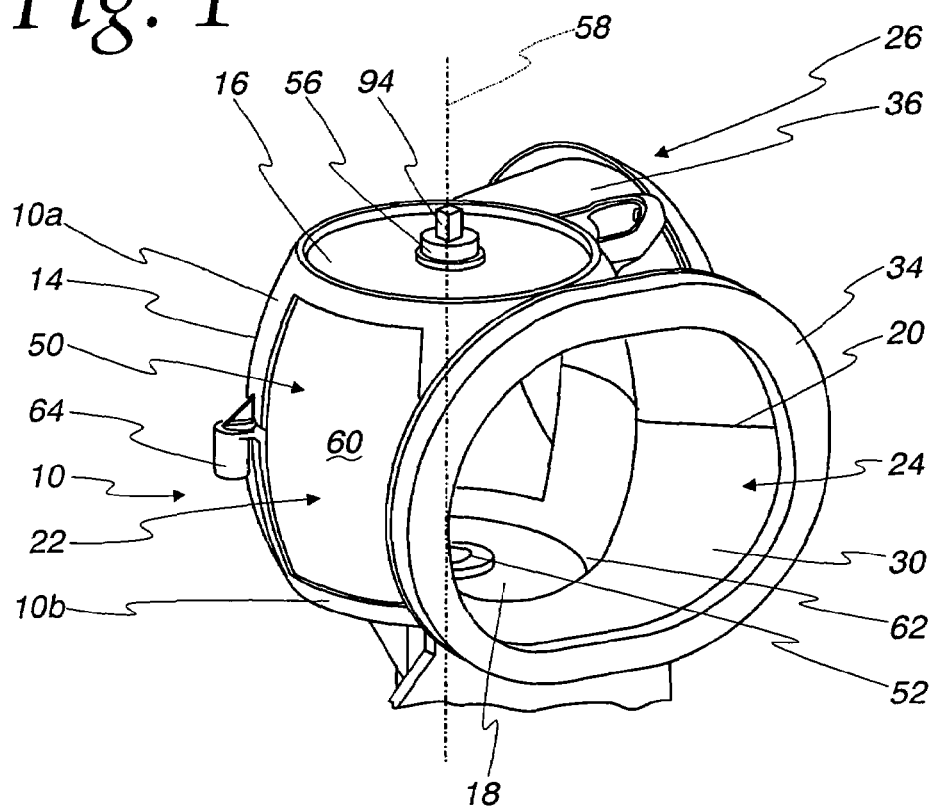
FIG. 1 is a perspective view of an air guide housing according to the present invention in one position for admitting fresh air.

An air guide housing 10 according to the present invention is shown in FIG. 1. The housing 10 includes a generally barrel shaped wall 14 between a cover 16 and bottom 18. For assembly purposes in particular, the air guide housing 10 may advantageously be made of two parts: an upper housing part 10a and a lower housing part 10b. The housing parts 10a, 10b may advantageously be made from plastic with an injection molding process, with a seam 20 (which may advantageously be sealed) formed between the housing parts 10a, 10b.

Three openings are provided in the barrel shaped wall 14. One opening 22 is for receiving circulating air (e.g., recirculating air from a vehicle passenger cabin). A second opening 24 is for receiving fresh air. A third opening 26 is for outputting air as described in greater detail hereafter.

A connector 30 is associated with the fresh air opening 24 and includes a flange 34 which may be mounted to suitably seal on an opening in the separation wall between the engine compartment and the passenger compartment. In the illustrated embodiment, the housing 10 is inside the passenger compartment, and air entering through the connector from the engine compartment would be fresh air from outside the passenger compartment.

Another connector 36 is associated with the output air opening 26 and may be suitably mounted to a fan 40 such as described in greater detail below in connection with FIG. 7. The fan 40 and the air guide housing 10 may be parts of, for example, a heater/air conditioning unit used to temper the air of the passenger compartment of the vehicle. Such a heater/air conditioner as a whole may be surrounded by a housing (not shown here).

No connector is required for the circulating air, since it can flow unhampered from the passenger compartment into the heater/air conditioner and is drawn in by the fan through the air guide housing 10 when the control of the heater/air conditioner requires switching to circulating air.

An adjustable door 50 is provided in the housing 10 to control air flow through the housing 10 as described below. The door 50 may be suitably mounted for selected pivoting inside the barrel shaped wall 14. In the illustrated embodiment, the door 50 includes one arm pivotally connected to the housing cover 16 and a second arm pivotally connected to the housing bottom 18. Specifically, a circular mounting disk 52 is pivotally secured to the housing bottom 18, and a similar mounting disk is pivotally secured to the housing cover 16, for example, by pivot supports 56 through central openings in the similarly circular cover 16 and bottom 18 which together define the pivot axis 58.

A closure element 60 is suitably connected to the mounting disks 52 so as to be positioned adjacent the barrel shaped wall 14, and pivotable with the disks between different positions therein.

A groove 62 with a suitable seal such as a labyrinth seal may be advantageously provided inside the edge of the cover 16 and the bottom 18. This groove 24 assists in preventing clattering noises of the door 50, which is sealed relative to flowing air and dammed-up air (as described further below) by the labyrinth seal in the groove 62.

It should be appreciated that the door 50 may be assembled in the housing 10 by first placing the door 50 between the housing parts 10a, 10b and then securing the parts 10a, 10b together, such as by screwing them together or by a releasable connection such as the illustrated fastening device 64.

As described further below, the closure element 60 may advantageously extend over a selected arc (around the pivot axis 58) around at least about ⅓ of the housing wall 14, with the circulated air and fresh air openings 22, 24 extending over an arc greater than the selected arc. As such and as further described below, it should be appreciated that the closure element 60 will not be large enough to be positioned to fully close both the circulated air and fresh air openings 22, 24 at the same time. Also, the door 50 can be rotated between stops 68, which are positioned so as to prevent the closure element 60 from blocking the outlet air opening 26. As a result, air can always be drawn through one or both of the circulated air and fresh air openings 22, 24 and then out the opening 26 by the fan 40, since at least one of the circulated air and fresh air openings 22, 24 is always partially or fully opened.

Figure 2:
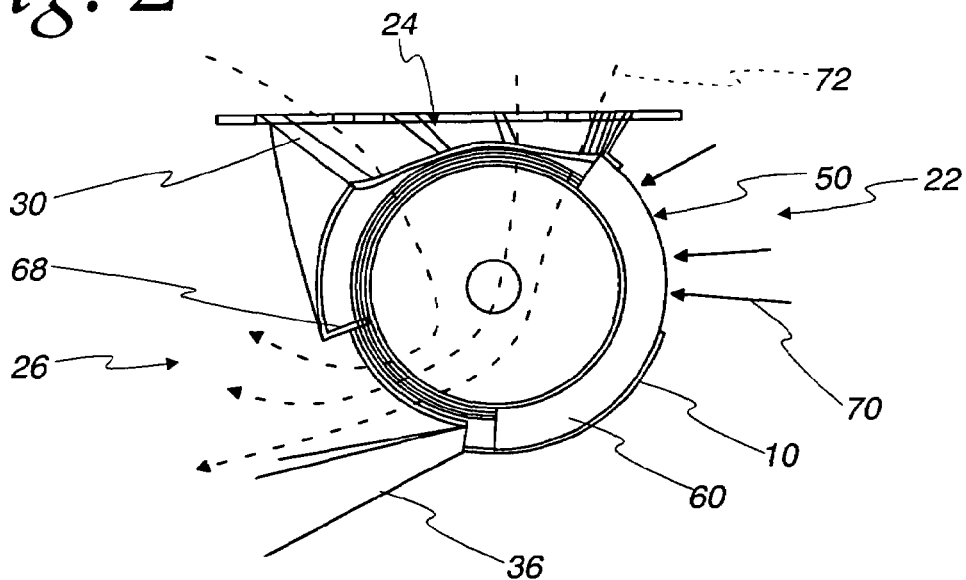
FIG. 2 is a cross-sectional view of the housing of FIG. 1.

As illustrated in FIGS. 1 and 2, the door 50 is positioned so that the closure element 60 fully closes the circulated air opening 22, whereby only fresh air reaches the air guide housing 10 through the opening 24 and the fresh air connector 30. Because the circulating air opening 22 is closed, the circulating air, indicated by arrow 70, dams up in front of closure element 60 of the door 50. As best illustrated in FIG. 2, the fresh air, shown by arrow 72, can pass unhampered through the fresh air connector 30 and opening 24 and flow through the air guide housing 10 and connector 36 to the fan 40.

Figure 3:
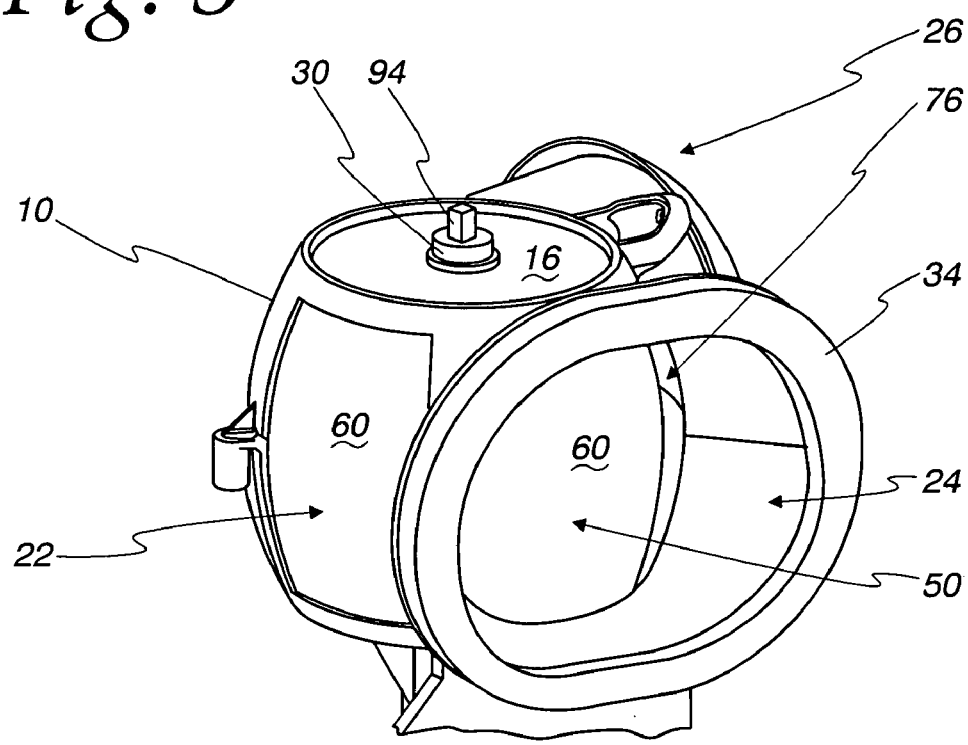
FIG. 3 is a perspective view of the air guide housing, showing the position of the revolving door in 80% dynamic pressure compensation of the fresh air.
Figure 4:
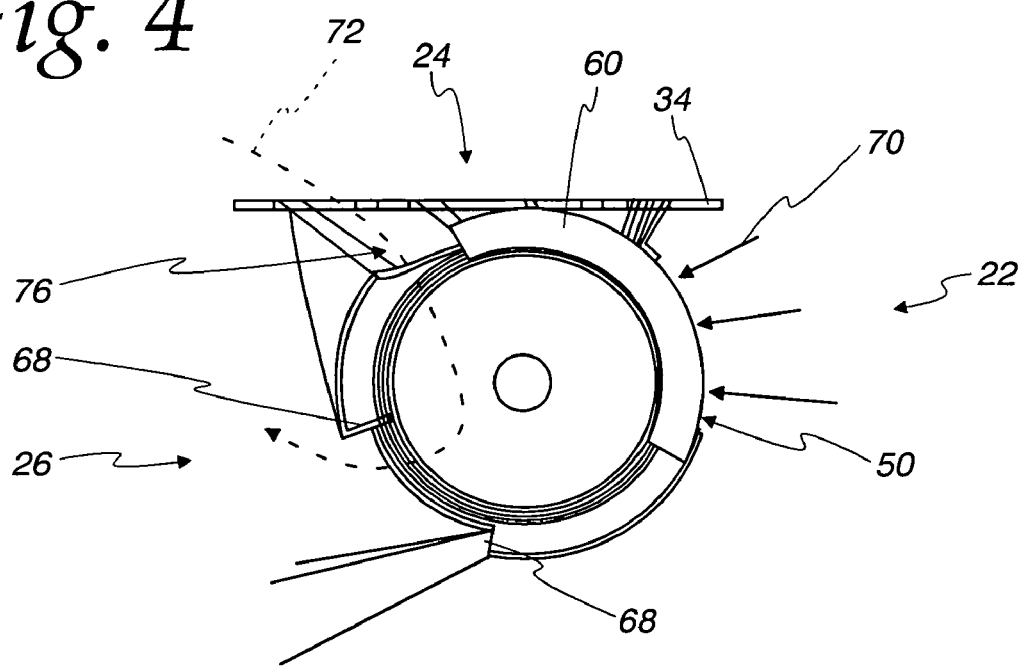
FIG. 4 is a cross-sectional view of the housing of FIG. 3.

FIGS. 3 and 4 show the air guide housing 10 in the position in which the dynamic pressure developed, for example, by a strong relative wind may be compensated for. In this position, the fresh air opening 24 is closed by the closure element 60 of the door 50, but with a small gap 76 remaining open to admit some fresh air into the air guide housing 10. At the same time, given its size as previously described, the closure element 60 ensures that the opening 22 for circulating air remains closed. This condition thus restricts flow of fresh air 72 into the air guide housing 10. At higher vehicle speeds, for example, the dynamic pressure is increased and therefore the fresh air opening 24 is largely but not completely closed to compensate for that dynamic pressure.

It should be appreciated that pivoting of the door 50 to reduce the size of the gap 76 could open a gap at the circulating air opening 22, as a result of which circulating air and fresh air can both flow into the air guide housing 10 without the fresh air passing through the circulating air opening 22 directly into the passenger compartment. This is achieved by the fact that the dynamic pressure of the fresh air is always compensated and the suction force of the fan 40 stipulates the direction in which the air can flow.

Figure 5:
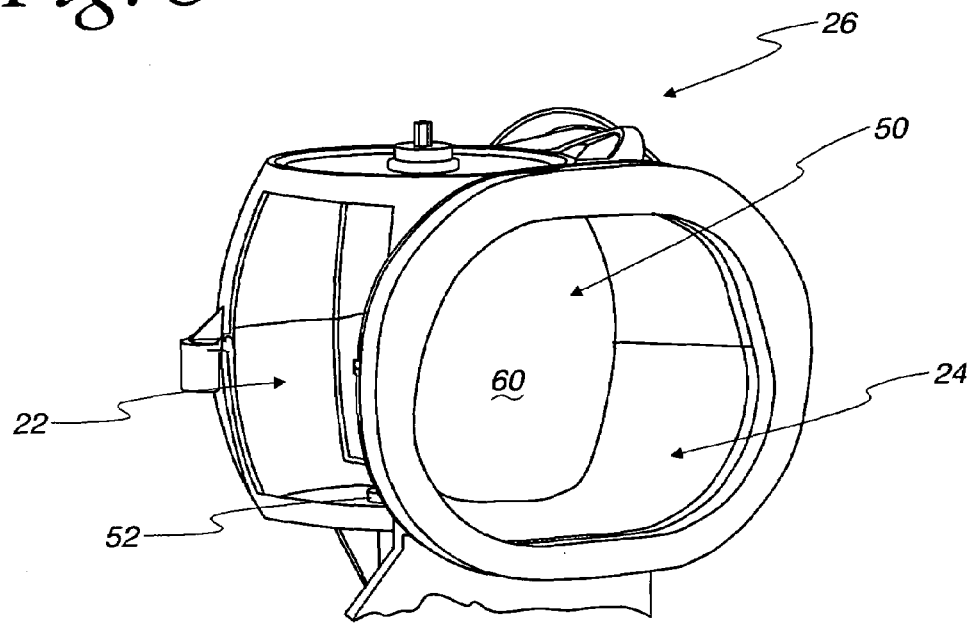
FIG. 5 is a perspective view of the air guide housing showing the position of the revolving door in the circulating air position.
Figure 6:
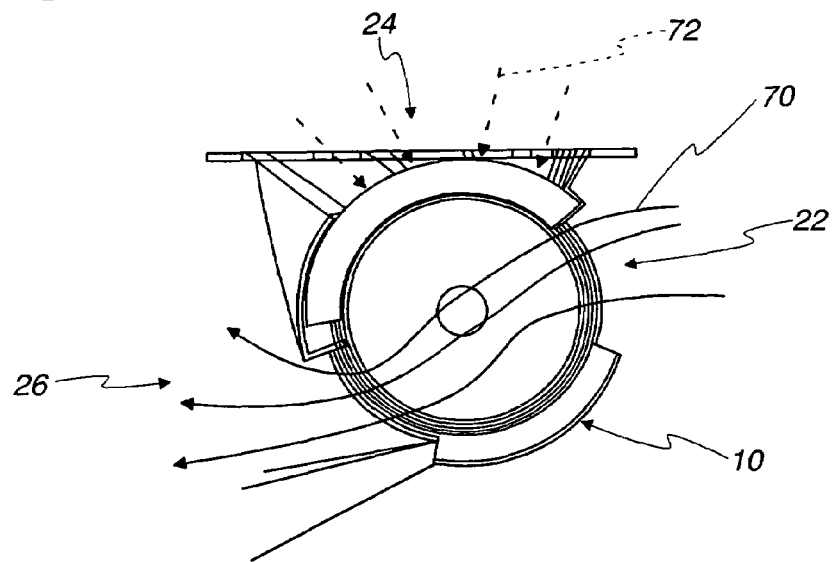
FIG. 6 is a cross-sectional view of the housing of FIG. 5.

When circulating air is desired for flow through the air guide housing 10, the closure element 60 of the door 50 is pivoted to completely close off the fresh air opening 22, with the circulating air opening 24 remaining fully open at the same time as shown in FIGS. 5 and 6. The labyrinth seal in the groove 62 serves to prevent undesired noise that could develop from the dynamic pressure of the fresh air. In the condition illustrated in FIGS. 5 and 6, the fresh air 72 dams up in front of the closure element 60 of the door 50, and the circulating air 70 is diverted in the air guide housing 10.

Figure 7:
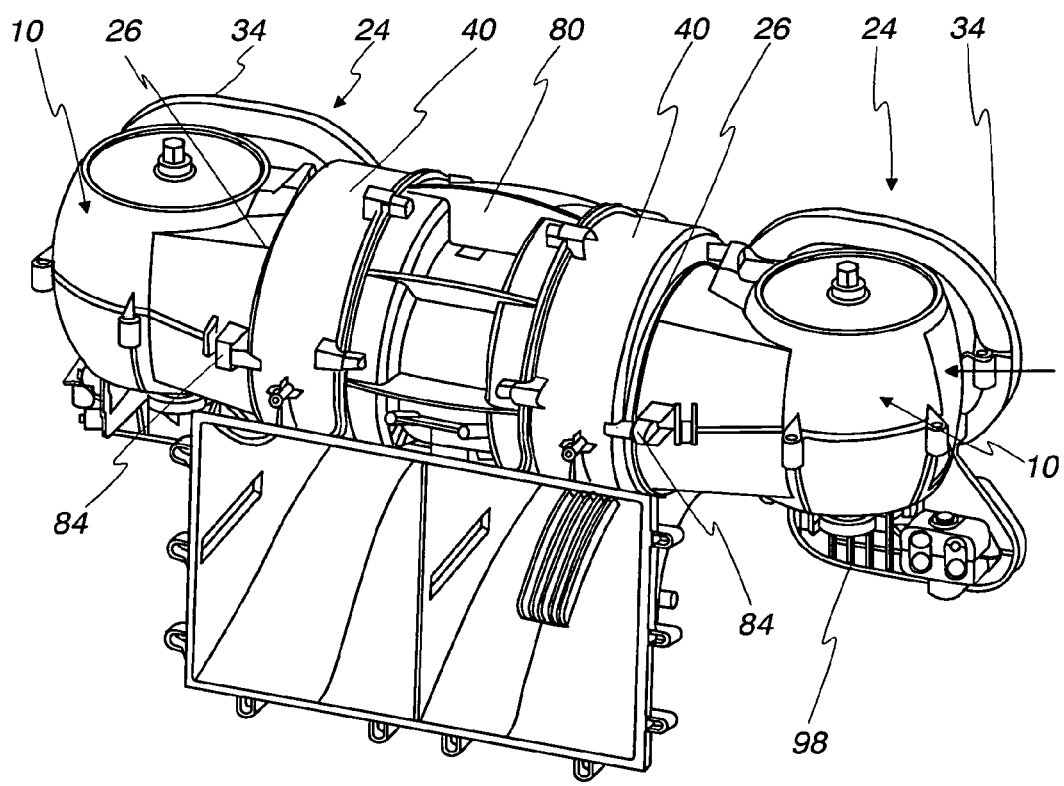
FIG. 7 is a perspective view of a pair of air guides according to the present invention as used in a vehicle.

FIG. 7 illustrates an advantageous embodiment in which two air guide housings 10 according to the present invention may be used. In this embodiment, the air guide housings 10 are mounted directly on fan 40 to the right and left in mirror symmetry relative to a drive unit 80 that drives two fans 40. The connector 36 of each housing 10 may advantageously include a suitable fastening device 84 to facilitate easy connection of the fan 40.

Figure 8:
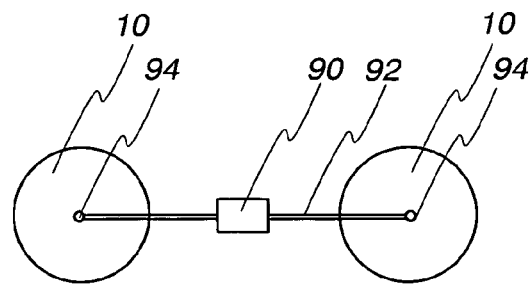
FIG. 8 schematically illustrates the operable coupling of the revolving doors of the two air guide housings in FIG. 7.

In the FIG. 7 configuration, the revolving doors 50 of both housings 10 may be advantageously moved together by a suitable drive, such as the servo motor 90 shown in FIG. 8. As schematically illustrated in FIG. 8, the servo motor 90 drives a coupling element 92 extending in diametrically opposite directions to the two housings, with the coupling element 92 drivably engaging pinions 94 on the pivot supports 56 of the doors 50 to move the doors 50 in mirror symmetry relative to each other. Suitable mounts 98 may also be provided to enable easy and secure fastening of the entire unit to the intermediate wall between the engine compartment and the passenger compartment. It should be understood, however, that the illustrated drive and connecting structures are merely exemplary, and that still other structures could be used for securing the housings 10 and driving the doors 50 within the broad scope of the present invention.

It should thus be appreciated that air guide housings provided according to the present invention may be reliably used to provide an advantageous air flow, where air supply to the passenger compartment of a vehicle is possible in all operating situations of the air conditioner. Further, such housings are simple so as to be reliably and cost-effectively manufactured, and reliably and inexpensively installed, operated and maintained. Moreover, advantageous smooth and noise free operation is provided while also guaranteeing dynamic pressure compensation necessary at higher driving speeds.

Still other aspects, objects, and advantages of the present invention can be obtained from a study of the specification, the drawings, and the appended claims. It should be understood, however, that the present invention could be used in alternate forms where less than all of the objects and advantages of the present invention and preferred embodiment as described above would be obtained.

The invention claimed is:

1. An air guide housing for an air supply for an input fan of an air conditioner, said housing comprising:
    a housing wall including a side wall having a first opening therethrough for circulating air and a second opening therethrough for fresh air, said first opening being adjacent said second opening;
    a third opening in said side wall for air drawn in by the fan;
    an adjustment element pivotally mounted in the housing wall, said adjustment element including a peripheral section defining a single, continuous closure element of the air guide housing adapted to block selected portions of said first and second openings, said peripheral section having a cross-section smaller than the sum of the cross-sections of the first and second openings and larger than each of the first and second openings.

2. An air guide housing for an air supply for an input fan of an air conditioner, said housing comprising:
    a housing wall including a side wall having a first opening therethrough for circulating air and a second opening therethrough for fresh air, said first opening being adjacent said second opening, wherein said housing wall is substantially barrel-like with a generally circular bottom and a generally circular cover;
    a third opening in said side wall for air drawn in by the fan;
    an adjustment element pivotally mounted in the housing wall, said adjustment element including a peripheral section defining a closure element of the air guide housing adapted to block selected portions of said first and second openings, said peripheral section having a cross-section smaller than the sum of the cross-sections of the first and second openings, and said adjustment element including generally circular plates defining arms pivotally secured to said bottom and said cover with said peripheral section secured between said arms.

3. The air guide housing of claim 1, wherein:
    said peripheral section extends over a selected arc around at least ⅓ of said housing;
    said first and second openings extend over an arc greater than said selected arc; and
    said selected arc and said arc of said first and second openings extend about the axis about which said adjustable element is pivotally mounted.

4. An air guide housing for an air supply for an input fan of an air conditioner, said housing comprising:
    a housing wall including a side wall having a first opening therethrough for circulating air and a second opening therethrough for fresh air, said first opening being adjacent said second opening;
    a third opening in said side wall for air drawn in by the fan;
    an adjustment element pivotally mounted in the housing wall, said adjustment element including a peripheral section defining a closure element of the air guide housing adapted to block selected portions of said first and second openings, said peripheral section having a cross-section smaller than the sum of the cross-sections of the first and second openings;
    wherein:
        said peripheral section extends over a selected arc around at least ⅓ of said housing,
        said first and second openings extend over an arc greater than said selected arc,
        said selected arc and said arc of said first and second openings extend about the axis about which said adjustable element is pivotally mounted,
        said housing wall is substantially barrel-like with a generally circular bottom and a generally circular cover, and
        said adjustment element includes generally circular plates defining arms pivotally secured to said bottom and said cover with said peripheral section secured between said arms.

5. The air guide housing of claim 1, further comprising stops fixed relative to said housing wall for limiting pivoting of said adjustment element.

6. An air guide housing for an air supply for an input fan of an air conditioner, said housing comprising:

a housing wall including a side wall having a first opening therethrough for circulating air and a second opening therethrough for fresh air, said first opening being adjacent said second opening;

a third opening in said side wall for air drawn in by the fan;

an adjustment element pivotally mounted in the housing wall, said adjustment element including a peripheral section defining a closure element of the air guide housing adapted to block selected portions of said first and second openings, said peripheral section having a cross-section smaller than the sum of the cross-sections of the first and second openings; and concentric grooves between said adjustment element plates and said housing wall bottom and cover.

7. The air guide housing of claim 6, wherein said concentric grooves define seals between said adjustment element plates and said housing wall bottom and cover.

8. The air guide housing of claim 1, wherein said housing wall comprises two housing parts releasably connected to each other with said adjustment element pivotally secured therebetween.

* * * * *